US012570326B2

(12) United States Patent
Lim

(10) Patent No.: US 12,570,326 B2
(45) Date of Patent: Mar. 10, 2026

(54) AUTONOMOUS DRIVING CHARGING ROBOT CONTROL METHOD, AUTONOMOUS DRIVING CHARGING ROBOT CONTROL DEVICE, RECORDING MEDIUM STORING INSTRUCTIONS TO PERFORM AUTONOMOUS DRIVING CHARGING ROBOT CONTROL METHOD

(71) Applicant: HL Robotics Co., Ltd., Seongnam (KR)

(72) Inventor: Joon Hoo Lim, Yongin-si (KR)

(73) Assignee: HL Robotics Co., Ltd., Seongnam (KR)

( * ) Notice: Subject to any disclaimer, the term of this patent is extended or adjusted under 35 U.S.C. 154(b) by 265 days.

(21) Appl. No.: 18/119,588

(22) Filed: Mar. 9, 2023

(65) Prior Publication Data

US 2023/0286544 A1 Sep. 14, 2023

(30) Foreign Application Priority Data

Mar. 10, 2022 (KR) ........................ 10-2022-0030245

(51) Int. Cl.
*B60W 60/00* (2020.01)
*B60W 30/09* (2012.01)
*B60W 30/182* (2020.01)

(52) U.S. Cl.
CPC ........ *B60W 60/0025* (2020.02); *B60W 30/09* (2013.01); *B60W 30/182* (2013.01); *B60W 2520/00* (2013.01); *B60W 2554/00* (2020.02)

(58) Field of Classification Search
CPC .......... B60L 53/35; B60L 53/36; B60L 53/37; A47L 11/24; B25J 9/0003; Y10S 901/01; E04H 4/1654
See application file for complete search history.

(56) References Cited

U.S. PATENT DOCUMENTS 5,450,320 A * 9/1995 Tsubaki ................... B62D 1/28
318/587
9,043,108 B2 * 5/2015 Sekiguchi ................. B60T 7/12
701/70

(Continued)

FOREIGN PATENT DOCUMENTS

KR 10-0835906 B1 6/2008
KR 10-2018-0130157 A1 12/2018

(Continued)

OTHER PUBLICATIONS

H.-H. Huang, J.-H. Su, C.-S. Lee, J.-Y. Syu, S.-W. Chao and Y.-W. Chang, "Implementation of the line maze robot with diagonal motion control," The 26th Chinese Control and Decision Conference (2014 CCDC), Changsha, China, 2014, pp. 2421-2425, doi: 10.1109/CCDC.2014.6852579. (Year: 2014).*

(Continued)

*Primary Examiner* — Fadey S. Jabr
*Assistant Examiner* — Mario C Gonzalez
(74) *Attorney, Agent, or Firm* — Harvest IP Law, LLP

(57) ABSTRACT

There is provided a method of controlling driving of an autonomous driving charging robot obtains a first position which is a position within a predetermined distance from a charging vehicle with which a charging power is to be supplied, and a second position which is a position of the autonomous driving charging robot that is to supply the charging power; calculates a displacement vector from the second position to the first position, and calculates an angle between a first direction which is a current heading direction of the autonomous driving charging robot, and a direction of the displacement vector; and determines a driving mode of the autonomous driving charging robot based on the angle, wherein, the heading direction, the first position and the second position are defined on a same plane.

17 Claims, 9 Drawing Sheets

(56)     References Cited

U.S. PATENT DOCUMENTS

| | | | | |
|---|---|---|---|---|
| 2011/0238254 A1* | 9/2011 | Mulder | ................ | B60W 40/02 |
| | | | | 701/1 |
| 2019/0008248 A1* | 1/2019 | Kovtun | ................ | G05D 1/0088 |
| 2020/0101855 A1* | 4/2020 | Lee | ...................... | G05D 1/0274 |
| 2021/0089034 A1* | 3/2021 | Hjelmaker | ........... | G05D 1/0212 |
| 2021/0165421 A1* | 6/2021 | Ko | ......................... | G05D 1/028 |
| 2021/0331315 A1* | 10/2021 | Park | ...................... | B25J 9/1676 |
| 2022/0326716 A1* | 10/2022 | Kumagai | ............. | G05D 1/0297 |
| 2024/0090731 A1* | 3/2024 | Liu | ......................... | G05D 1/661 |

FOREIGN PATENT DOCUMENTS

| | | | |
|---|---|---|---|
| KR | 10-2014333 B1 | | 8/2019 |
| KR | 10-2014338 B1 | | 8/2019 |
| KR | 102014340 B1 | * | 8/2019 |
| KR | 10-2020-0037548 A1 | | 4/2020 |
| KR | 10-2021-0060402 A1 | | 5/2021 |

OTHER PUBLICATIONS

Office Action in Korean Application No. 10-2022-0030245 dated Feb. 5, 2024 and English translation.

* cited by examiner

AUTONOMOUS DRIVING CHARGING ROBOT CONTROL METHOD, AUTONOMOUS DRIVING CHARGING ROBOT CONTROL DEVICE, RECORDING MEDIUM STORING INSTRUCTIONS TO PERFORM AUTONOMOUS DRIVING CHARGING ROBOT CONTROL METHOD

TECHNICAL FIELD

The present disclosure relates to an autonomous driving charging robot control method, an autonomous driving charging robot control device, a computer program for performing the control method, and a computer readable recording medium.

BACKGROUND

In recent years, due to various problems such as depletion of fossil fuels and environmental pollution, research and development of transportation means to replace them are actively conducted, and in particular, the development of electric vehicles that use electricity as energy is being actively pursued.

Electric vehicles do not use fossil fuels, so there is little environmental pollution problem, but there is a problem that the amount of charge per charge is small, and accordingly, a driver or user needs to find a charging station that can be charged every time for charging, which causes inconvenience.

In order to solve this problem, away from the way the driver or user searches for a charging station every time, an autonomous charging robot that moves autonomously to a location and charges a charging vehicle is being developed, by which the robot receives the charging request of the vehicle that needs to be charged, and the robot directly charges the vehicle according to the charging process of the autonomous driving charging robot.

SUMMARY

In the charging process of a conventional autonomous driving charging robot, while a path from the robot to a vehicle requiring charging is calculated, the current heading direction of the robot is changed in the direction of the path to move through the calculated path, and the heading direction of the robot is maintained and adjusted according to the calculated path, a process of moving along the calculated path and readjusting the heading direction of the robot based on the parked direction of the vehicle requiring charging was required. In the conventional charging process of the autonomous driving charging robot, the heading direction of the autonomous driving charging robot has been adjusted several times, and there is a need for an autonomous charging robot and its control method that can reduce the total time from the charging request point to the charging completion point.

An object to be solved by the present disclosure is to provide a method and a device for moving to a position of a charging vehicle using the heading direction of an autonomous driving charging robot.

However, the problem to be solved by the present disclosure is not limited to those mentioned above, and another problem to be solved that is not mentioned can be clearly understood by those skilled in the art from the description below.

In accordance with an aspect of the present disclosure, there is provided a method of controlling driving of an autonomous driving charging robot performed by an autonomous driving charging robot control device, the method may comprise obtaining a first position which is a position within a predetermined distance from a charging vehicle with which a charging power is to be supplied, and a second position which is a position of the autonomous driving charging robot that is to supply the charging power; calculating a displacement vector from the second position to the first position, and calculating an angle between a first direction which is a current heading direction of the autonomous driving charging robot, and a direction of the displacement vector; and determining a driving mode of the autonomous driving charging robot based on the angle, wherein, the heading direction, the first position and the second position are defined on a same plane.

The method is performed when a magnitude of the displacement vector is equal to or less than a predetermined value.

The driving mode may comprise: a first driving mode for controlling driving of the autonomous driving charging robot along the direction of the displacement vector while maintaining the current heading direction in the first direction when the angle is equal to or greater than a first preset value and less than a second preset value; a second driving mode for controlling driving of the autonomous driving charging robot along a first component vector of the displacement vector in the first direction while maintaining the current heading direction in the first direction, and controlling driving of the autonomous driving charging robot along a second component vector of the displacement vector, the second component vector being perpendicular to the first component vector and parallel to the plane, when the angle is less than the first preset value; and a third diving mode for controlling driving of the autonomous driving charging robot along the second component vector of the displacement vector while maintaining the heading direction in the first direction, and controlling driving of the autonomous driving charging robot along the first component vector of the displacement vector, when the angle is equal to or greater than the second preset value The method may comprise determining whether the autonomous driving charging robot reaches the first position; determining a heading direction of the charging vehicle from a sensor included in the autonomous driving charging robot when the autonomous driving charging robot reaches the first position; calculating a second direction, which is a heading direction in which the autonomous driving charging robot at a predetermined position is capable of charging, based on the obtained heading direction of the charging vehicle; controlling the autonomous driving charging robot to change the current heading direction of the autonomous driving charging robot to be same as the second direction; and controlling the autonomous driving charging robot to move to the predetermined position.

The second direction may comprise a direction perpendicular to the heading direction of the charging vehicle and on the plane.

The method may comprise determining obstacle information including size and position information of an obstacle located in a driving direction of the autonomous driving charging robot detected by a sensor included in the autonomous driving charging robot while driving; calculating the size of the obstacle from the obtained obstacle information; and stopping the autonomous driving charging robot for a predetermined time when the calculated size of the obstacle is equal to or greater than a predetermined size.

The method may comprise after the stopping of the autonomous driving charging robot for the predetermined time, determining whether or not the obstacle exists in the driving direction of the autonomous driving charging robot detected by the sensor; if the obstacle exists, determining an outside of the obstacle from information of the obstacle; and controlling driving of the autonomous driving charging robot by being spaced apart from the outside of the determined obstacle by a safe distance.

In accordance with another aspect of the present disclosure, there is provided a device of controlling an autonomous driving charging robot, the device may comprise: a transceiver configured to obtain a first position which is a position within a predetermined distance from a charging vehicle with which a charging power is to be supplied, and a second position which is a position of the autonomous driving charging robot that is to supply the charging power; a memory, and a processor configured to: calculate a displacement vector from the second position to the first position; calculate an angle between a first direction which is a current heading direction of the autonomous driving charging robot, and a direction of the displacement vector; and determine a driving mode of the autonomous driving charging robot based on the angle, wherein, the heading direction, the first position and the second position are defined on a same plane.

The processor may be configured to control the autonomous driving charging robot when a magnitude of the displacement vector is equal to or less than a predetermined value.

The driving mode may comprise: a first driving mode for controlling driving of the autonomous driving charging robot along the direction of the displacement vector while maintaining the current heading direction in the first direction when the angle is equal to or greater than a first preset value and less than a second preset value; a second driving mode for controlling driving of the autonomous driving charging robot along a first component vector of the displacement vector in the first direction while maintaining the current heading direction in the first direction, and controlling driving of the autonomous driving charging robot along a second component vector of the displacement vector, the second component vector being perpendicular to the first component vector and parallel to the plane, when the angle is less than the first preset value; and a third diving mode for controlling driving of the autonomous driving charging robot along the second component vector of the displacement vector while maintaining the heading direction in the first direction, and controlling driving of the autonomous driving charging robot along the first component vector of the displacement vector, when the angle is equal to or greater than the second preset value.

The processor may be configured to: determine whether that the autonomous driving charging robot reaches the first position; determine a heading direction of the charging vehicle from a sensor included in the autonomous driving charging robot when the autonomous driving charging robot reaches the first position; calculate a second direction, which is a heading direction in which the autonomous driving charging robot at a predetermined position is capable of charging, based on the obtained heading direction of the charging vehicle; control the autonomous driving charging robot to change the current heading direction of the autonomous driving charging robot to be same as the second direction; and control the autonomous driving charging robot to move to the predetermined position.

The second direction may comprise a direction perpendicular to the heading direction of the charging vehicle and on the plane.

The transceiver may be configured to obtain obstacle information including size and position information of an obstacle located in a driving direction of the autonomous driving charging robot detected by a sensor included in the autonomous driving charging robot while driving, and the processor is configured to calculate the size of the obstacle from the obtained obstacle information, and stop the autonomous driving charging robot for a predetermined time when the calculated size of the obstacle is equal to or greater than a predetermined size.

The processor may be configured to: after the stopping of the autonomous driving charging robot for the predetermined time, determine whether or not the obstacle exists in the driving direction of the autonomous driving charging robot detected by the sensor; if the obstacle exists, determine an outside of the obstacle from information of the obstacle; and control driving of the autonomous driving charging robot by being spaced apart from the outside of the determined obstacle by a safe distance.

In accordance with another aspect of the present disclosure, there is provided a non-transitory computer-readable storage medium storing a computer program, which comprises instructions for a processor to perform a method of controlling driving of an autonomous driving charging robot, the method may comprise: obtaining a first position which is a position within a predetermined distance from a charging vehicle with which a charging power is to be supplied, and a second position which is a position of the autonomous driving charging robot that is to supply the charging power; calculating a displacement vector from the second position to the first position, and calculating an angle between a first direction which is a current heading direction of the autonomous driving charging robot, and a direction of the displacement vector; and determining a driving mode of the autonomous driving charging robot based on the angle, wherein, the heading direction, the first position and the second position are defined on a same plane.

The method may be performed when a magnitude of the displacement vector is equal to or less than a predetermined value.

The driving mode may comprise: a first driving mode for controlling driving of the autonomous driving charging robot along the direction of the displacement vector while maintaining the current heading direction in the first direction when the angle is equal to or greater than a first preset value and less than a second preset value; a second driving mode for controlling driving of the autonomous driving charging robot along a first component vector of the displacement vector in the first direction while maintaining the current heading direction in the first direction, and controlling driving of the autonomous driving charging robot along a second component vector of the displacement vector perpendicular to the first component vector and parallel to the plane, when the angle is less than the first preset value; and a third diving mode for controlling driving of the autonomous driving charging robot along the second component vector of the displacement vector while maintaining the heading direction in the first direction, and controlling driving of the autonomous driving charging robot along the first component vector of the displacement vector, when the angle is equal to or greater than the second preset value.

The method may comprise: determining whether that the autonomous driving charging robot reaches the first position; determining a heading direction of the charging vehicle from a sensor included in the autonomous driving charging robot when the autonomous driving charging robot reaches the first position; calculating a second direction, which is a heading direction in which the autonomous driving charging robot at a predetermined position is capable of charging, based on the obtained heading direction of the charging vehicle; controlling the autonomous driving charging robot to change the current heading direction of the autonomous driving charging robot to be same as the second direction; and controlling the autonomous driving charging robot to move to the predetermined position.

The second direction may comprise a direction perpendicular to the heading direction of the charging vehicle and on the plane.

The method may comprise: determining obstacle information including size and position information of an obstacle located in a driving direction of the autonomous driving charging robot detected by a sensor included in the autonomous driving charging robot while driving; calculating the size of the obstacle from the obtained obstacle information; and stopping the autonomous driving charging robot for a predetermined time when the calculated size of the obstacle is equal to or greater than a predetermined size.

According to an embodiment of the present disclosure, since the driving path is set according to the angle at which the autonomous driving charging robot located within a predetermined distance from the charging vehicle is headed, according to the wheel characteristics of the autonomous driving charging robot, it is possible for the autonomous driving charging robot to approach the vehicle requiring charging efficiently. In addition, since the autonomous driving charging robot drives with the heading direction fixed and the autonomous driving charging robot reaches the charging target point and then adjusts the heading direction, it is possible to approach the charging vehicle more quickly.

DETAILED DESCRIPTION

Figure 1:
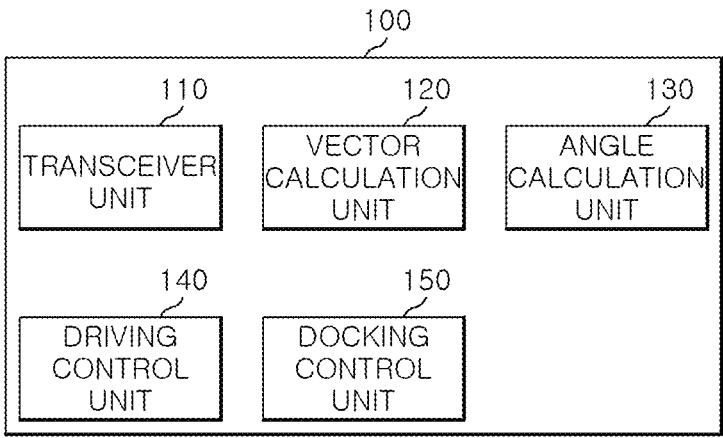
FIG. 1 describes a block diagram for explaining the function of an autonomous driving charging robot control device according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 2:
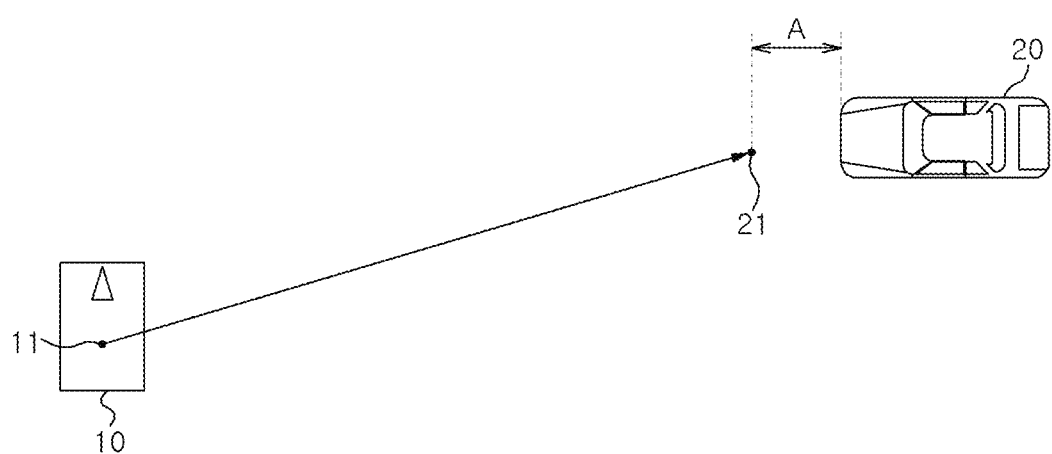
FIG. 2 depicts a diagram illustrating that an autonomous driving charging robot and a charging vehicle request charging.

FIG. 1 is a block diagram for explaining the function of an autonomous driving charging robot control device according to an embodiment of the present disclosure, and FIG. 2 is a diagram illustrating that the autonomous driving charging robot and a charging vehicle request charging.

Referring to FIGS. 1 and 2, the autonomous driving charging robot 10 may charge the charging vehicle 20 by driving to a target location 21 according to a charging request of the charging vehicle 20. To this end, the autonomous driving charging robot 10 may include a communication unit, a driving device, a sensor, and an autonomous driving charging robot control device 100.

A sensor included in the autonomous driving charging robot 10 may detect the position, size, posture, and the like of an object. For example, the sensor may include at least one of a laser sensor, an ultrasonic sensor, a camera, and a LIDAR sensor.

The autonomous driving charging robot 10 may include a driving device including a Mecanum wheel, and may be capable of driving in all directions to drive to the location of the charging vehicle 20. In other words, according to the embodiment, the autonomous driving charging robot 10 is capable of driving in a direction perpendicular to the heading direction and parallel to the ground, and also in an oblique direction with respect to the heading direction, in addition to straight or backward driving in the heading direction of the autonomous driving charging robot 10.

In addition, in this specification, for convenience of description, it is described that the autonomous driving charging robot control device 100 is included in the autonomous driving charging robot 10, but unlike this, the autonomous driving charging robot control device 100 may be located outside of the autonomous driving charging robot 10 to control the autonomous driving charging robot 10. In this case, the autonomous driving charging robot control device 100 may transmit a control command of the autonomous driving charging robot 10 to the autonomous driving charging robot 10 through wired or wireless communication. The control method of controlling the autonomous driving charging robot 10 by the autonomous driving charging robot control device 100 is not limited thereto.

Hereinafter, functions of the autonomous driving charging robot control device 100 according to the embodiment of the present disclosure will be described.

The autonomous driving charging robot control device 100 may include a transceiver unit 110, a vector calculation unit 120, an angle calculation unit 130, a driving control unit 140, and a docking control unit 150. Of course, since FIG. 1 is only exemplary, the spirit of the present disclosure is not limited to that shown in FIG. 1.

The autonomous driving charging robot control device 100 may control the movement including driving and rotation of the autonomous driving charging robot 10. When included in the autonomous driving charging robot 10, the autonomous driving charging robot control device 100 may control the movement of the autonomous charging robot through internal signaling.

The transceiver unit 110 can receive data and information from the autonomous driving charging robot 10 and the charging vehicle 20 through wired and wireless communication, and can transmit data and information to the autonomous driving charging robot 10 and the charging vehicle 20. A method for the transceiver unit 110 to obtain data and information is not limited thereto.

According to the embodiment, the transceiver unit 110 may obtain information on a first position 21, which is a position within a predetermined distance (A) from the charging vehicle 20 requesting charging, and a second position 11, which is the position of the autonomous driving charging robot 10.

In addition, the transceiver unit 110 may obtain information on an object existing around the autonomous driving charging robot 10 from a sensor included in the autonomous driving charging robot 10. According to the embodiment, the transceiver unit 110 may obtain heading direction information of the charging vehicle 20 from information such as the posture and position of the charged vehicle 20 from the sensor. In addition, the transceiver unit 110 may obtain a distance between the autonomous driving charging robot 10 and the charging vehicle 20 from the sensor.

The vector calculation unit 120 may calculate the displacement vector 30 from the information about the first position 11 and the second position 21 obtained by the transceiver unit 110, and the components of the calculated displacement vector can be divided into two component vectors.

The angle calculation unit 130 may calculate an angle for determining the driving mode of the autonomous charging robot 10 using the vector calculated by the vector calculation unit 120 and the heading direction of the autonomous driving charging robot 10.

The driving control unit 140 may determine the driving mode of the autonomous driving charging robot 10 and control the driving of the autonomous driving charging robot 10 according to the driving mode. In addition, according to the embodiment, the driving control unit 140 may control the driving of the autonomous driving charging robot 10 to stop and avoid the obstacle when an obstacle exists on the driving path of the autonomous driving charging robot 10.

The docking control unit 150 may control the movement of the autonomous driving charging robot 10 to charge the charging vehicle 20 after the charging vehicle 20 reaches the second position 21. These movements may include a rotation for heading alignment of the autonomous driving charging robot 10 moving in the direction for charging the charging vehicle 20 by the autonomous driving charging robot 10, and a movement for aligning the distance for the autonomous driving charging robot 10 to move to a distance for charging the charging vehicle 20.

Hereinafter, in FIGS. 3 to 5, a method of determining a driving mode of the autonomous driving charging robot 10 and a driving control method of the autonomous driving charging robot 10 will be described.

Figure 3:
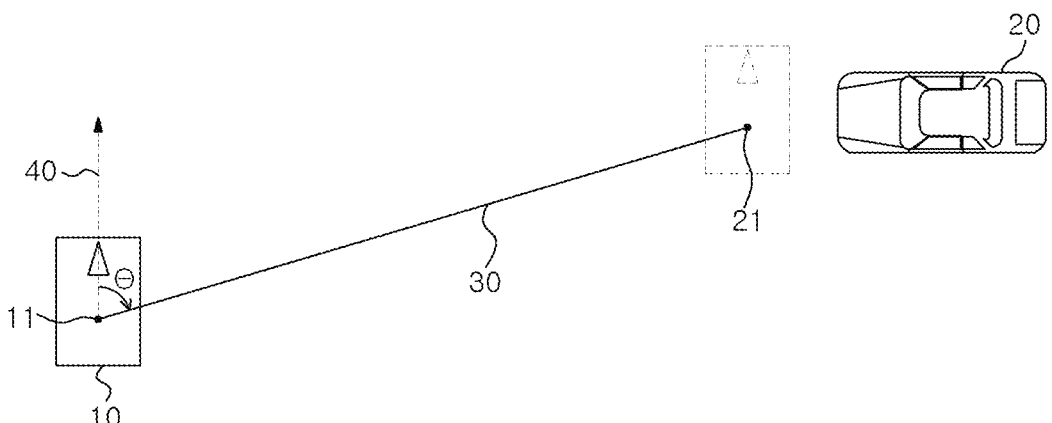
FIG. 3 shows a first driving mode according to an angle between a displacement vector to a target point and a heading direction of an autonomous driving charging robot according to an embodiment of the present disclosure.
Figure 4:
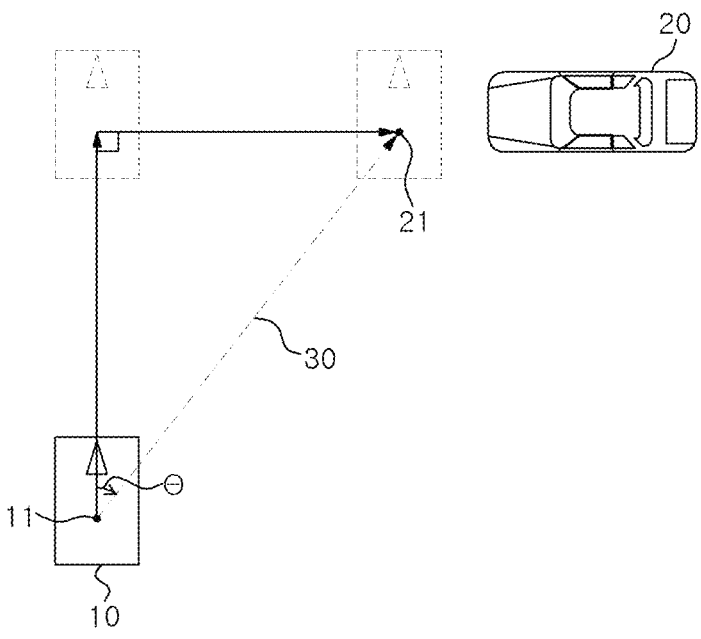
FIG. 4 represents a second driving mode according to an angle between a displacement vector to a target point and a heading direction of an autonomous driving charging robot according to an embodiment of the present disclosure.
Figure 5:
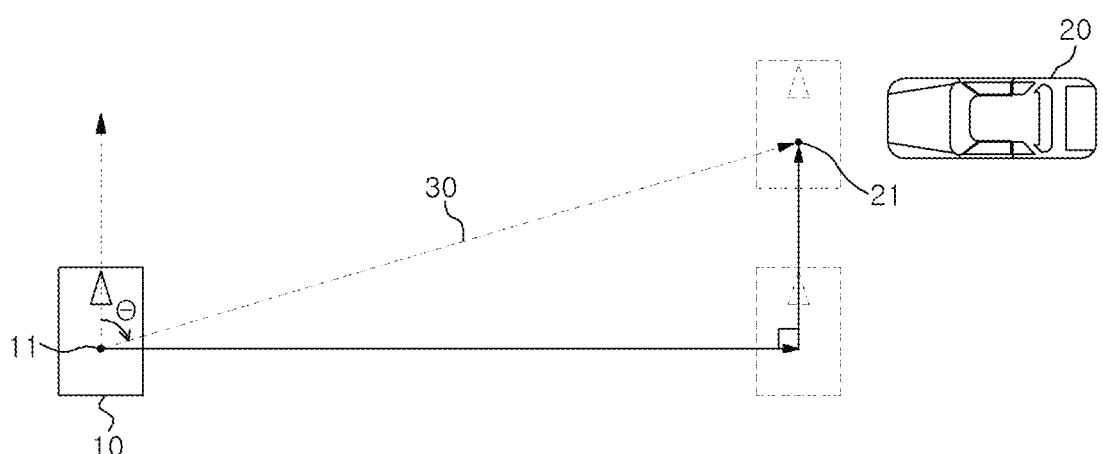
FIG. 5 shows a third driving mode according to an angle between a displacement vector to a target point and a heading direction of an autonomous driving charging robot according to an embodiment of the present disclosure.

FIGS. 3 to 5 show each driving mode based on an angle between a displacement vector to a target point and a heading direction of the autonomous driving charging robot according to the embodiment of the present disclosure.

FIG. 3 shows a first driving mode according to an angle between a displacement vector to a target point and a heading direction of the autonomous driving charging robot according to the embodiment of the present disclosure.

Referring further to FIG. 3, the transceiver unit 110 of FIG. 1 may obtain a first position 21 that is a position within a predetermined distance from the obtained charging vehicle 20 and a second position 11 that is the position of the autonomous driving charging robot 10.

The vector calculation unit 120 of FIG. 1 may calculate a displacement vector 30 from the second position 11 to the first position 21. Here, the displacement vector includes a direction and a linear distance.

The angle calculation unit 130 of FIG. 1 may calculate an angle (θ) between the first direction 40 which is the current heading direction of the autonomous driving charging robot 10, and the direction of the displacement vector 30. More specifically, before moving to charge the charging vehicle 20, the autonomous driving charging robot 10 may be stationary towards a heading direction, which is a direction in which the front part of the autonomous driving charging robot 10 is directed in a predetermined direction in the second position 11. The angle calculation unit 130 of FIG. 1 may calculate an angle (θ) between the first direction 40 and the direction of the displacement vector 30 in order for the driving control unit 140 to determine the driving mode.

The driving control unit 140 of FIG. 1 may determine the driving mode of the autonomous driving charging robot 10 based on the angle (θ) calculated by the angle calculation unit 130 of FIG. 1. In addition, the driving control unit 140 of FIG. 1 may control the autonomous driving charging robot 10 to drive according to the determined driving mode. Here, the driving mode may include a first driving mode, a second driving mode, and a third driving mode.

According to the embodiment, the control method in which the autonomous driving charging robot control device 100 of FIG. 1 controls the autonomous driving charging robot 10 may be performed when the size of the displacement vector 30 calculated by the vector calculation unit 120 of FIG. 1 is equal to or less than a predetermined value. For example, the predetermined value may be 5 m.

That is, the autonomous driving charging robot control device 100 of FIG. 1 may calculate the angle (θ) and determine the driving mode based on the calculated angle (θ) for faster charging and efficient driving when the distance between the autonomous driving charging robot 10 and the first position 21 which is the charging target position, is within a predetermined distance.

According to the embodiment, the driving control unit 140 of FIG. 1 may determine the driving mode as the first driving mode when the angle (θ) calculated by the angle calculation unit 130 of FIG. 1 is equal to or greater than a preset first value and less than a preset second value. In the first driving mode, the driving control unit 140 of FIG. 1 controls the driving of the autonomous driving charging robot 10 in the direction of the displacement vector 30 while maintaining the heading direction in the first direction 40. For example, the first value may be 40 degrees and the second value may be 50 degrees.

Since the autonomous driving charging robot 10 can also drive in an oblique line with respect to the current heading direction of the autonomous driving charging robot 10 due to the characteristic of the Mecanum wheel, the driving control unit 140 of FIG. 1 may drive in a straight line from the second position 11 to the first position 21 while the heading direction of the autonomous driving charging robot 10 is fixed to the first direction 40.

FIG. 4 shows a second driving mode according to an angle between a displacement vector to a target point and a heading direction of the autonomous driving charging robot according to the embodiment of the present disclosure.

Referring further to FIG. 4, the driving control unit 140 of FIG. 1 may determine the driving mode as the second driving mode when the angle (θ) calculated by the angle calculation unit 130 of FIG. 1 is less than a preset first value. For example, the first value may be 40 degrees.

When the driving control unit 140 of FIG. 1 determines the driving mode as the second driving mode, the vector calculation unit 120 of FIG. 1 may decompose the displacement vector 30 into a component of the first direction 40 which is a current heading direction of the autonomous driving charging robot 10 and a component of the second direction perpendicular to the first direction 40 and parallel to the ground.

In the second driving mode, the driving control unit 140 of FIG. 1 may control the driving of the autonomous driving charging robot 10 in the previously decomposed component of the first direction 40 while maintaining the heading direction of the autonomous driving charging robot 10 in the first direction 40, and then, may control the autonomous driving charging robot 10 in the decomposed component of the second direction.

FIG. 5 shows a third driving mode according to an angle between a displacement vector to a target point and a heading direction of the autonomous driving charging robot according to the embodiment of the present disclosure.

Referring further to FIG. 5, the driving control unit 140 of FIG. 1 may determine the driving mode as the third driving mode when the angle (θ) calculated by the angle calculation unit 130 of FIG. 1 is equal to or greater than a preset second value. For example, the second value may be 50 degrees.

When the driving control unit 140 of FIG. 1 determines the driving mode as the third driving mode, the vector calculation unit 120 of FIG. 1 may decompose the displacement vector 30 into a component of the first direction 40 and a component of the second direction perpendicular to the first direction 40 and parallel to the ground.

In the third driving mode, the driving control unit 140 of FIG. 1 may control the driving of the autonomous driving charging robot 10 in the previously decomposed component of the second direction 40 while maintaining the heading direction of the autonomous driving charging robot 10 in the first direction 40, and then, may control the autonomous driving charging robot 10 in the decomposed component of the first direction.

That is, the driving control unit 140 of FIG. 1 may compare the lengths of the component of the first direction 40 and the component of the second direction of the displacement vector 30 decomposed by the vector calculation unit 120 in the second driving mode and the third driving mode, may first control the driving of the autonomous driving charging robot 10 in the long direction component, and then may control the driving of the autonomous driving charging robot 10 in the short direction component, while maintaining the heading direction of the autonomous driving charging robot 10 in the first direction 40.

Since the driving control unit 140 of FIG. 1 controls the driving while maintaining the heading direction of the autonomous driving charging robot 10 in the first direction 40, it is possible to quickly charge the charging vehicle 20 since the time that the autonomous driving charging robot 10 needs to align the heading for docking or the rotation time of the autonomous driving charging robot 10 can be reduced.

In addition, the driving control unit 140 of FIG. 1 first controls the driving of the autonomous driving charging robot 10 in the long direction component and then controls the driving of the autonomous driving charging robot 10 in the short direction component, thereby reducing an error that may occur until reaching the first position 11 by correcting an error generated while driving in the long direction component and by driving in the short direction component. Here, the driving order may vary depending on the operating environment.

The autonomous driving charging robot control device 100 of FIG. 1 may control the driving of the autonomous driving charging robot 10 to the first position 21 while fixing the heading direction of the autonomous driving charging robot 10 by the first driving mode to the third driving mode, and may perform the heading alignment and distance alignment of the autonomous driving charging robot 10 for docking to the charging vehicle 20 after the autonomous driving charging robot 10 reaches the first position 21.

Figures 6A, 6B, 6C:
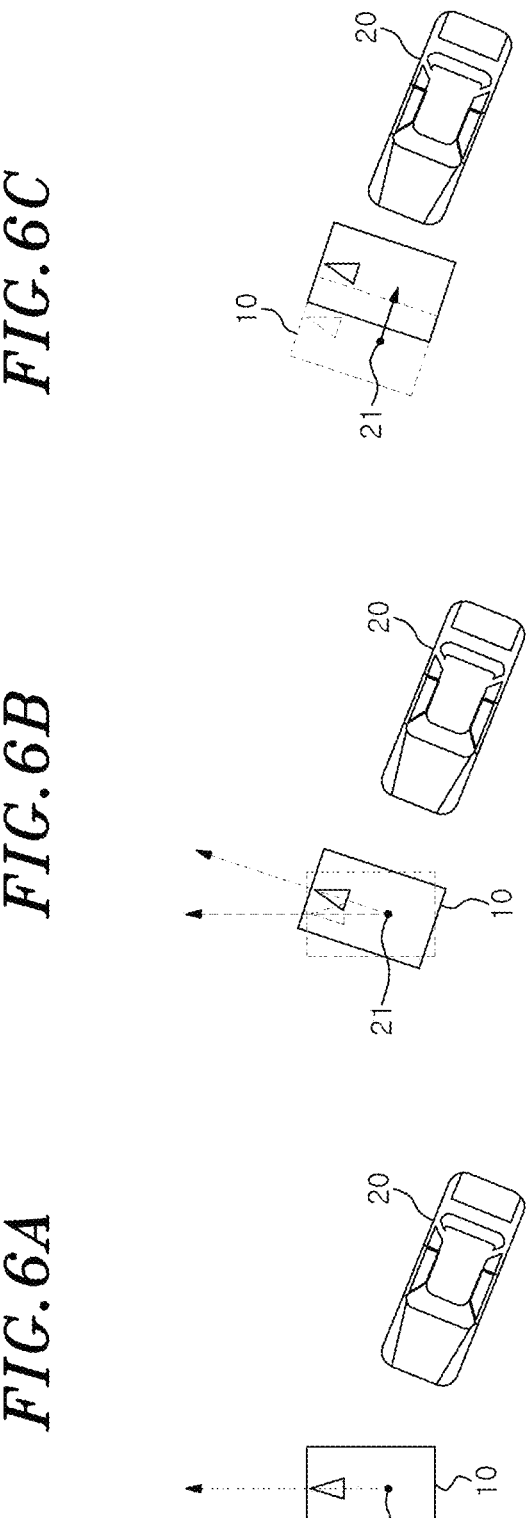
FIGS. 6A to 6C illustrate a control method for charging a charging vehicle after an autonomous driving charging robot reaches a target location according to an embodiment of the present disclosure.

FIGS. 6A to 6C illustrate a control method for charging the charging vehicle after the autonomous driving charging robot reaches the target location according to the embodiment of the present disclosure.

Referring to FIG. 6A, the docking control unit 150 of FIG. 1 checks whether the autonomous driving charging robot 10 has reached the first position 21, and when it has reached the first position, a docking control of the autonomous driving charging robot 10 for charging the charging vehicle 20 can be performed.

Here, the docking control may include all of the control methods that control detailed movements of the autonomous driving charging robot 10 for charging the charging vehicle 20, such as heading alignment, distance alignment, docking, and charging of the autonomous driving charging robot 10 at the first position 21.

FIG. 6B shows that the autonomous driving charging robot control device controls the heading alignment of the autonomous driving charging robot.

Referring to FIG. 6B, according to the embodiment, the transceiver unit 110 of FIG. 1 may calculate the chargeable heading direction of the autonomous driving charging robot 10 by using the heading direction of the charging vehicle 20 obtained from the sensor.

According to the embodiment, the heading direction in which the autonomous driving charging robot 10 may be a heading direction so that the side of the autonomous driving charging robot 10 comes to the front part of the heading direction of the charging vehicle 20 in consideration of the heading direction of the charging vehicle 20 obtained from the sensor. That is, the heading direction in which the autonomous driving charging robot 10 can charge may be a direction perpendicular to the heading direction of the charging vehicle 20 and parallel to the ground.

The autonomous driving charging robot control device 100 of FIG. 1 may control the rotation of the autonomous driving charging robot 10 in the calculated chargeable heading direction.

FIG. 6C shows that the autonomous driving charging robot control device controls distance alignment of the autonomous driving charging robot.

Referring further to FIG. 6C, the docking control unit 150 of FIG. 1 aligns the heading direction of the autonomous driving charging robot 10 with the parked vehicle in consideration of the direction in which the charging vehicle 20 is parked. At this time, the distance for docking and charging of the charging vehicle 20 is farther or closer than the distance between the autonomous driving charging robot 10 and the charging vehicle 20, and the distance for docking and charging of the charging vehicle 20 may not be secured. Therefore, the docking control unit 150 of FIG. 1 may perform distance alignment of the autonomous driving charging robot 10.

According to the embodiment, the docking control unit 150 of FIG. 1 may control the autonomous driving charging robot 10 to move to a predetermined position where the charging vehicle 20 can be charged.

The docking control unit 150 of FIG. 1 may further control an operation of connecting the charging terminal of the autonomous driving charging robot 10 with the charging vehicle 20 after the autonomous driving charging robot 10 moves to a predetermined position where the charging is possible, and an operation that the autonomous driving charging robot 10 is charging in alignment with the parked charging vehicle 20.

Figure 7:
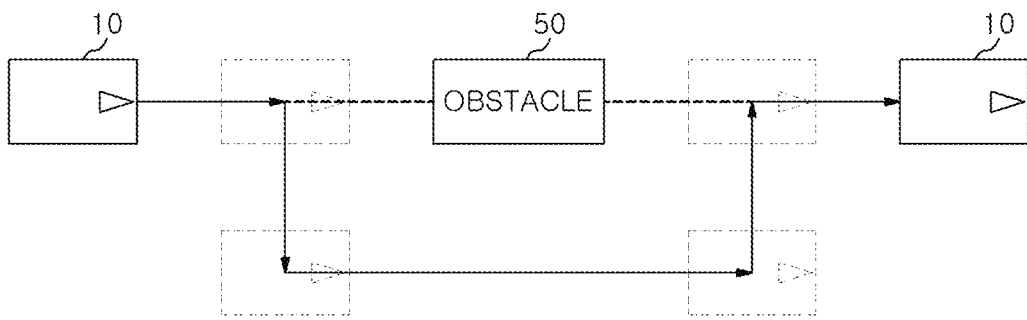
FIG. 7 illustrates a driving control method of an autonomous driving charging robot when an obstacle exists on a driving path of the autonomous driving charging robot according to an embodiment of the present disclosure.

FIG. 7 illustrates a driving control method of the autonomous driving charging robot when an obstacle exists on a driving path of the autonomous driving charging robot according to the embodiment of the present disclosure.

Referring further to FIG. 7, an obstacle 50 may exist on the driving path along which the autonomous driving charging robot 10 moves to the first position 21, so there is a case that it may no longer be able to drive.

Here, the obstacle 50 may be a moving obstacle 50 or may be a fixed obstacle 50. In addition, since the obstacle 50 is small in size, the autonomous driving charging robot control device 100 may control the autonomous driving charging robot 10 to avoid the obstacle 50 or to stop from information on the obstacle 50 including the type and size of the obstacle 50 so that the autonomous driving charging robot 10 can drive despite the existence of the obstacle 50.

According to the embodiment, the transceiver unit 110 of FIG. 1 may obtain information on the obstacle 50 including the size and position information of the obstacle 50 located in the driving direction of the autonomous driving charging robot 10 detected by the sensor included in the autonomous driving charging robot 10 in driving.

Subsequently, the driving control unit 140 of FIG. 1 may calculate the size of the obstacle 50 from the obtained information about the obstacle 50, and if the calculated size of the obstacle is greater than or equal to a predetermined size, the driving control unit 140 may stop the autonomous driving charging robot 10 for a certain amount of time.

Here, the size of the obstacle 50 means a predetermined size in which the obstacle 50 occupies a space. For example, the size of the obstacle 50 may mean the volume of the obstacle 50 from the outside of the obstacle 50, and may mean a two-dimensional area of the obstacle 50 located on a plane parallel to the ground in a range smaller than the height of the autonomous driving charging robot 10. Also, the area on a two-dimensional plane may mean the size of a rectangle circumscribing the obstacle 50 on the driving path of the autonomous driving charging robot 10.

The driving control unit 140 of FIG. 1 may compare whether the autonomous driving charging robot 10 is of a size incapable of driving the driving path with a predetermined size based on information including the size and position of the obstacle 50 obtained from the sensor.

In addition, when the size of the obstacle 50 is larger than the predetermined size, since the autonomous driving charging robot 10 cannot drive according to the original driving path and the obstacle 50 may be a moving obstacle (e.g., a person or an animal), the driving control unit 140 of FIG. 1 may make the autonomous driving charging robot 10 to stop and wait for a predetermined time until the obstacle 50 moves. For example, the predetermined time may be 10 seconds.

If the size of the obstacle 50 is smaller than the predetermined size, the autonomous driving charging robot 10 can drive along the original driving path, so the driving control unit 140 of FIG. 1 may control the autonomous driving charging robot 10 to drive along the driving path without stopping it.

Since the driving control unit 140 of FIG. 1 is an obstacle 50 having a predetermined size or larger, even after the autonomous driving charging robot 10 is stopped, the obstacle 50 may still exist on the driving path without moving. Therefore, the driving control unit 140 may determine whether or not the obstacle 50 exists on the driving path after controlling the autonomous driving charging robot 10 to stop, and may perform avoidance control.

According to the embodiment, after the driving control unit 140 of FIG. 1 stops the autonomous driving charging robot 10 for a predetermined time, it is possible to determine whether there is an obstacle 50 located in the driving direction of the autonomous driving charging robot 10, the obstacle being detected by the sensor included in the autonomous driving charging robot 10, and if there is an obstacle, it is possible to determine the outside of the obstacle 50. In addition, the driving control unit 140 of FIG. 1 may control the driving of the autonomous driving charging robot 10 so as to travel away from the determined obstacle by a safe distance.

For example, as shown in FIG. 7, when the obstacle 50 on the driving path of the autonomous driving charging robot 10 is equal to or larger than a predetermined size, the driving control unit 150 of FIG. 1 may make the autonomous driving charging robot 10 to be stopped and wait for a predetermined time. If the obstacle 50 is still located on the driving path of the autonomous driving charging robot 10 even after stopping for the predetermined time, the driving control unit 150 of FIG. 1 may control the autonomous driving charging robot 10 while being spaced apart by the safe distance which is a distance from which the collision with the obstacle does not occur from the outside of the obstacle.

The avoidance control of the driving control unit 150 of FIG. 1 for avoiding the obstacle may be also controlled to move in an oblique line, vertical/lateral or curved line rather than the heading direction because the autonomous driving charging robot 10 includes a Mecanum wheel.

In FIG. 7, since the case where the obstacle 50 is rectangular is described as an example, it is illustrated that the driving control unit 150 of FIG. 1 moves the autonomous driving charging robot 10 laterally to a position spaced apart by a safe distance, moves to pass the obstacle on a path parallel to the original driving path, and then returns to the original driving path. According to the embodiment, when the obstacle 50 has an elliptical shape, the driving control unit 150 of FIG. 1 drives the autonomous driving charging robot 10 in an elliptical shape along a position spaced apart by a safe distance from the outer ellipse of the obstacle 50, and returns it to the original driving path.

Among the above-described embodiments of the present disclosure, the transceiver unit 110, the vector calculation unit 120, the angle calculation unit 130, the driving control unit 140, and the docking control unit 150 of FIG. 1 may be implemented by hardware, firmware, software, or the combination thereof.

For example, the transceiver unit 110 of FIG. 1 may be implemented by a communication interface device capable of performing wireless communication using a 3G, 4G, 5G, 6G, or LTE network, and the vector calculation unit 120, the angle calculation unit 130, the driving control unit 140 and docking control unit 150 of FIG. 1 may be implemented by Application Specific Integrated Circuits (ASICs), Digital Signal Processors (DSPs), Digital Signal Processing Devices (DSPDs), Programmable Logic Devices (PLDs), FPGAs (Field Programmable Gate Arrays), processors, controllers, microcontrollers, microprocessors, etc.

In the case of implementation by firmware or software, the method according to the embodiments of the present disclosure may be implemented in the form of a module, a procedure, or a function that performs the functions or operations described above. The software codes may be stored in a memory unit and run by a processor. The memory unit may be located inside or outside the processor and exchange data with the processor by various means known in the art.

Figure 8:
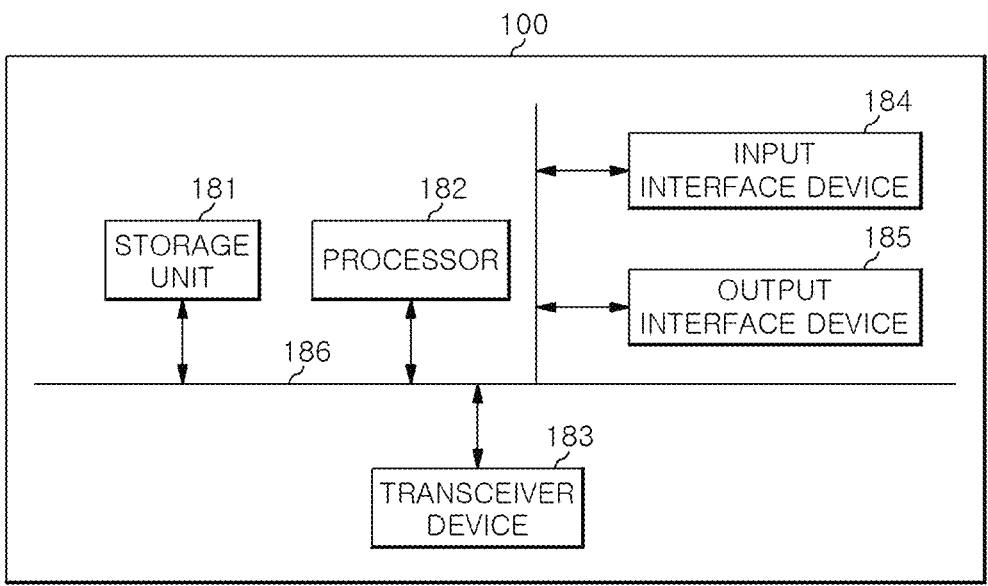
FIG. 8 describes a block diagram for explaining an autonomous driving charging robot control device according to an embodiment of the present disclosure in terms of hardware.

FIG. 8 is a block diagram for explaining the autonomous driving charging robot control device according to the embodiment of the present disclosure in terms of hardware.

Referring to FIGS. 1 and 8, the autonomous driving charging robot control device 100 may include a storage device 181 for storing at least one command, a processor 182 for executing at least one command of the storage device 181, a transceiver device 183, an input interface device 184, and an output interface device 185.

Each component 181, 182, 183, 184, 185 included in the autonomous driving charging robot control device 100 may be connected by a data bus 186 and perform communication with each other.

The storage device 181 may include at least one of a memory or a volatile storage medium and a non-volatile storage medium. For example, the storage device 181 may include at least one of a read only memory (ROM) and a random access memory (RAM).

The storage device 181 may further include at least one command to be executed by the processor 182 to be described later, and may store therein a predetermined time for the autonomous driving charging robot 10 to wait inputted from the user through the input interface device 184, a safe distance, etc.

The processor 182 may mean a central processing unit (CPU), a graphics processing unit (GPU), a micro controller unit (MCU), or a dedicated processor on which methods according to embodiments of the present disclosure are performed.

As described above, the processor 182 may perform functions of the vector calculation unit 120, the angle calculation unit 130, the driving control unit 140, and the docking control unit 150 by at least one program command stored in the storage device 181, and each of them may be stored in the memory in the form of at least one module and may be executed by the processor.

The transceiver device 183 may receive or transmit data from an internal device or an external device connected through communication, and may perform the functions of the transceiver unit 110.

The input interface device 184 may receive at least one control signal or set value from a user. For example, the input interface device 184 may receive a predetermined first value, a second value, size information of an obstacle to be avoided, chargeable distance information, stop time value, etc., and may update each input value and information.

The output interface device 185 may output and visualize at least one information including an obstacle detection message and a stop message by the operation of the processor 182.

In the above, the autonomous driving charging robot control device 100 according to the embodiment of the present disclosure has been described. Hereinafter, a method for controlling the autonomous driving charging robot executed by the operation of the processor in the autonomous driving charging robot control device 100 according to another aspect of the present disclosure will be described.

Figure 9:
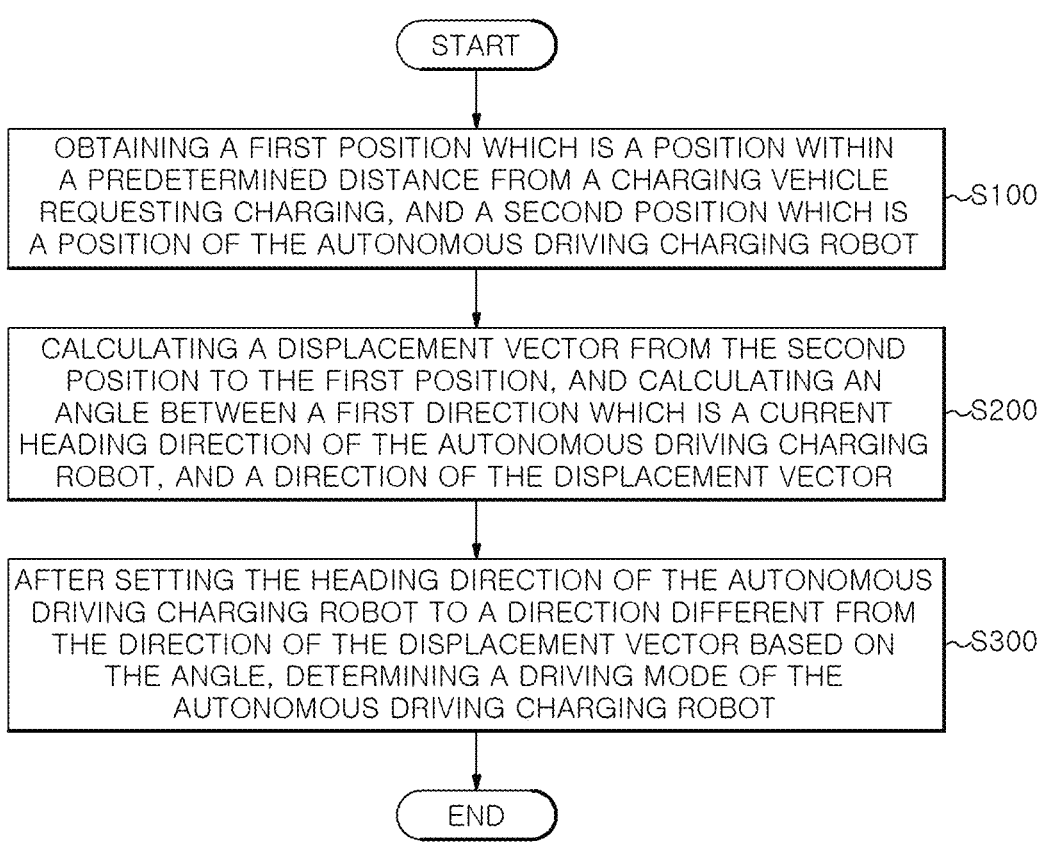
FIG. 9 shows a flowchart of a method for controlling an autonomous driving charging robot according to another aspect of the present disclosure.

FIG. 9 is a flowchart of a method for controlling the autonomous driving charging robot according to another aspect of the present disclosure.

Referring further to FIG. 9, first, the transceiver device 183 may obtain a first position, which is a position within a predetermined distance from the charging vehicle requesting charging, and a second position, which is the position of the autonomous driving charging robot (S100).

Subsequently, the processor 182 may calculate a displacement vector from the second position to the first position, and calculate an angle between the first direction, which is the current heading direction of the autonomous driving charging robot, and the direction of the displacement vector (S200).

Further, the processor 182 may determine the driving mode of the autonomous driving charging robot 10 based on the calculated angle (S300).

In addition, the method of controlling the autonomous driving charging robot 10 includes the method of controlling the autonomous driving charging robot 10 that can be performed by the autonomous driving charging robot control device 100, and the parts described for the above-described autonomous driving charging robot control device 100 will be used for the parts that are not described about the method of controlling the autonomous driving charging robot.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable storage medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

16

What is claimed is:

1. A method of controlling driving of an autonomous driving charging robot performed by an autonomous driving charging robot control device, comprising:

obtaining a first position and a second position, the first position being within a predetermined distance from a charging vehicle to which a charging power is to be supplied, and the second position being a position of the autonomous driving charging robot that is to supply the charging power;

calculating a displacement vector from the second position to the first position;

calculating an angle between a first direction and a direction of the displacement vector, the first direction being a current heading direction of the autonomous driving charging robot;

determining whether a driving mode is a first driving mode or a second driving mode, the first driving mode being determined when the angle is less than 40 degrees and the second driving mode being determined when the angle is greater than 50 degrees;

in case the first driving mode is determined, controlling the autonomous driving charging robot to move along the first direction, and then to move along a second direction perpendicular to the first direction, the first direction and the second direction corresponding to component vectors of the displacement vector; and in case the second driving mode is determined, controlling the autonomous driving charging robot to move along the second direction, and then to move along the first direction, wherein the current heading direction of the autonomous driving charging robot is maintained while the autonomous driving charging robot is moving from the second position to the first position.

2. The method of claim 1, wherein the method is performed when a magnitude of the displacement vector is equal to or less than a predetermined value.

3. The method of claim 1, further comprising:

determining whether the autonomous driving charging robot reaches the first position;

determining a third direction, the third direction being a heading direction of the charging vehicle, the heading direction of the charging vehicle being sensed by a sensor of the autonomous driving charging robot;

calculating a fourth direction based on the third direction, the fourth direction being a heading direction in which the autonomous driving charging robot is capable of charging with respect to the charging vehicle;

controlling the autonomous driving charging robot to change its heading direction from the first direction to the fourth direction.

4. The method of claim 3, wherein the fourth direction is perpendicular to the third direction, the third direction and the fourth direction are defined on a horizontal plane.

5. The method of claim 1, further comprising:

determining obstacle information including size and position information of an obstacle located in a driving direction of the autonomous driving charging robot detected by a sensor included in the autonomous driving charging robot while driving;

calculating the size of the obstacle from the obtained obstacle information; and stopping the autonomous driving charging robot for a predetermined time when the calculated size of the obstacle is equal to or greater than a predetermined size.

6. The method of claim 5, further comprising:

after the stopping of the autonomous driving charging robot for the predetermined time, determining whether or not the obstacle exists in the driving direction of the autonomous driving charging robot detected by the sensor;

if the obstacle exists, determining an outside of the obstacle from information of the obstacle; and controlling driving of the autonomous driving charging robot by being spaced apart from the outside of the determined obstacle by a safe distance.

7. A device of controlling an autonomous driving charging robot, comprising:

a transceiver configured to obtain a first position and a second position, the first position being within a predetermined distance from a charging vehicle to which a charging power is to be supplied, and the second position being a position of the autonomous driving charging robot that is to supply the charging power;

a memory; and a processor configured to:

calculate a displacement vector from the second position to the first position;

calculate an angle between a first direction and a direction of the displacement vector, the first direction being a current heading direction of the autonomous driving charging robot;

determining whether a driving mode is a first driving mode or a second driving mode, the first driving mode being determined when the angle is less than 40 degrees and the second driving mode being determined when the angle is greater than 50 degrees;

in case the first driving mode is determined, controlling the autonomous driving charging robot to move along the first direction, and then to move along a second direction perpendicular to the first direction, the first direction and the second direction corresponding to component vectors of the displacement vector; and in case the second driving mode is determined, controlling the autonomous driving charging robot to move along the second direction, and then to move along the first direction, wherein the current heading direction of the autonomous driving charging robot is maintained while the autonomous driving charging robot is moving from the second position to the first position.

8. The device of claim 7, wherein the processor is further configured to control the autonomous driving charging robot when a magnitude of the displacement vector is equal to or less than a predetermined value.

9. The device of claim 7, wherein the processor is further configured to:

determine whether the autonomous driving charging robot reaches the first position;

determine a third direction, the third direction being a heading direction of the charging vehicle, the heading direction of the charging vehicle being sensed by a sensor of the autonomous driving charging robot;

calculate a fourth direction based on the third direction, the fourth direction being a heading direction in which the autonomous driving charging robot is capable of charging with respect to the charging vehicle;

control the autonomous driving charging robot to change its heading direction from the first direction to the fourth direction.

10. The device of claim 9, wherein the fourth direction is perpendicular to the third direction, the third direction and the fourth direction are defined on a horizontal plane.

11. The device of claim 7, wherein the transceiver is configured to obtain obstacle information including size and position information of an obstacle located in a driving direction of the autonomous driving charging robot detected by a sensor included in the autonomous driving charging robot while driving, and the processor is further configured to calculate the size of the obstacle from the obtained obstacle information, and stop the autonomous driving charging robot for a predetermined time when the calculated size of the obstacle is equal to or greater than a predetermined size.

12. The device of claim 11, wherein the processor is further configured to:

after the stopping of the autonomous driving charging robot for the predetermined time, determine whether or not the obstacle exists in the driving direction of the autonomous driving charging robot detected by the sensor; if the obstacle exists, determine an outside of the obstacle from information of the obstacle; and control driving of the autonomous driving charging robot by being spaced apart from the outside of the determined obstacle by a safe distance.

13. A non-transitory computer-readable storage medium including computer executable instructions, wherein the instructions, when executed by a processor, cause the processor to perform a method of controlling driving of an autonomous driving charging robot, the method comprising:

obtaining a first position and a second position, the first position being within a predetermined distance from a charging vehicle to which a charging power is to be supplied, and the second position being a position of the autonomous driving charging robot that is to supply the charging power;

calculating a displacement vector from the second position to the first position;

calculating an angle between a first direction and a direction of the displacement vector, the first direction being a current heading direction of the autonomous driving charging robot;

determining whether a driving mode is a first driving mode or a second driving mode, the first driving mode being determined when the angle is less than 40 degrees and the second driving mode being determined when the angle is greater than 50 degrees;

in case the first driving mode is determined, controlling the autonomous driving charging robot to move along the first direction, and then to move along a second direction perpendicular to the first direction, the first direction and the second direction corresponding to component vectors of the displacement vector; and in case the second driving mode is determined, controlling the autonomous driving charging robot to move along the second direction, and then to move along the first direction, wherein the current heading direction of the autonomous driving charging robot is maintained while the autonomous driving charging robot is moving from the second position to the first position.

14. The non-transitory computer-readable storage medium of claim 13, wherein the method is performed when a magnitude of the displacement vector is equal to or less than a predetermined value.

15. The non-transitory computer-readable storage medium of claim 13, wherein the method further comprises:

determining whether the autonomous driving charging robot reaches the first position;

determining a third direction, the third direction being a heading direction of the charging vehicle, the heading direction of the charging vehicle being sensed by a sensor of the autonomous driving charging robot;

calculating a fourth direction based on the third direction, the fourth direction being a heading direction in which the autonomous driving charging robot is capable of charging with respect to the charging vehicle;

controlling the autonomous driving charging robot to change its heading direction from the first direction to the fourth direction.

16. The non-transitory computer-readable storage medium of claim 15, wherein the fourth direction is perpendicular to the third direction, the third direction and the fourth direction are defined on a horizontal plane.

17. The non-transitory computer-readable storage medium of claim 13, wherein the method further comprises:

determining obstacle information including size and position information of an obstacle located in a driving direction of the autonomous driving charging robot detected by a sensor included in the autonomous driving charging robot while driving;

calculating the size of the obstacle from the obtained obstacle information; and stopping the autonomous driving charging robot for a predetermined time when the calculated size of the obstacle is equal to or greater than a predetermined size.

* * * * *